(12) United States Patent
Lacko

(10) Patent No.: US 9,366,202 B2
(45) Date of Patent: Jun. 14, 2016

(54) SYSTEM AND METHOD FOR CAPTURED INNER FIXED STRUCTURE

(71) Applicant: ROHR, INC., Chula Vista, CA (US)

(72) Inventor: Anthony Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 265 days.

(21) Appl. No.: 14/092,372

(22) Filed: Nov. 27, 2013

(65) Prior Publication Data

US 2015/0143796 A1 May 28, 2015

(51) Int. Cl.
| | | |
|---|---|---|
| *F02K 1/76* | (2006.01) | |
| *F02K 1/80* | (2006.01) | |
| *B64D 29/06* | (2006.01) | |
| *F02K 1/64* | (2006.01) | |

(52) U.S. Cl.
CPC .............. *F02K 1/766* (2013.01); *B64D 29/06* (2013.01); *F02K 1/64* (2013.01); *F02K 1/80* (2013.01); *Y02T 50/671* (2013.01)

(58) Field of Classification Search
CPC ............. F02C 7/20; F02K 1/80; F02K 1/805; F02K 1/766; F02K 1/54; F02K 1/64; F02K 1/605; F02K 1/625; F02K 1/72; B64D 29/06; B64D 29/08; B64D 29/00; F05D 2260/30
See application file for complete search history.

(56) References Cited

U.S. PATENT DOCUMENTS

| | | | | |
|---|---|---|---|---|
| 4,683,717 | A * | 8/1987 | Naud .................. | B64D 29/08 60/226.1 |
| 5,603,471 | A * | 2/1997 | Armstrong ............ | B64D 29/00 239/265.31 |
| 6,334,588 | B1 * | 1/2002 | Porte .................... | B64D 29/08 244/129.4 |
| 2009/0173823 | A1 * | 7/2009 | Shetzer ................ | B64D 29/06 244/129.4 |
| 2013/0259641 | A1 * | 10/2013 | Stewart ................. | F01D 25/24 415/1 |

OTHER PUBLICATIONS

Office Action dated Jan. 23, 2015 in French Application No. 14 61552 (an English summary is not readily available).
Office Action dated Sep. 25, 2015 in French Application No. 14 61552.

* cited by examiner

*Primary Examiner* — Andrew Nguyen
(74) *Attorney, Agent, or Firm* — Snell & Wilmer, LLP

(57) ABSTRACT

A propulsion system of an aircraft includes an inner fixed structure (IFS) and the outer sleeve that may be separately coupled to the pylon. For instance, the inner fixed structure and the outer sleeve may move independently with respect to each other. A single latch of the latching system disclosed herein, may be configured to latch all 4 panels, (e.g. both halves of the IFS and both doors of the outer sleeve) together and/or in a closed and retained position.

15 Claims, 5 Drawing Sheets

SYSTEM AND METHOD FOR CAPTURED INNER FIXED STRUCTURE

FIELD

The present disclosure relates to an aircraft engine nacelle, and more particularly, to the construction of the thrust reverser of such a nacelle.

BACKGROUND

A nacelle for a turbofan propulsion system on a typical commercial airliner is the structure which surrounds the engine providing smooth aerodynamic surfaces for airflow around and into the engine. The nacelle also helps define a bypass air duct through the propulsion system. The nacelle may also include a thrust reverser which can deploy and provide reverse thrust to help slow the aircraft after landing. The thrust reverser structure is commonly provided in two halves which are separately mounted via hinges to either side of the propulsion system. The two halves can be unlatched and swung open to provide access to the engine for maintenance or other purposes.

SUMMARY

A latching system of a thrust reverser of an aircraft is described herein. In this system, the inner fixed structure (IFS) and the outer sleeve may be separately coupled to the pylon. For instance, the inner fixed structure and the outer sleeve may be hinged separately to the pylon. For instance, the inner fixed structure and the outer sleeve may move independently with respect to each other. A single latch of the latching system disclosed herein may be configured to latch all 4 panels, (e.g. both halves of the IFS and both doors of the outer sleeve) together and/or in a closed and retained position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
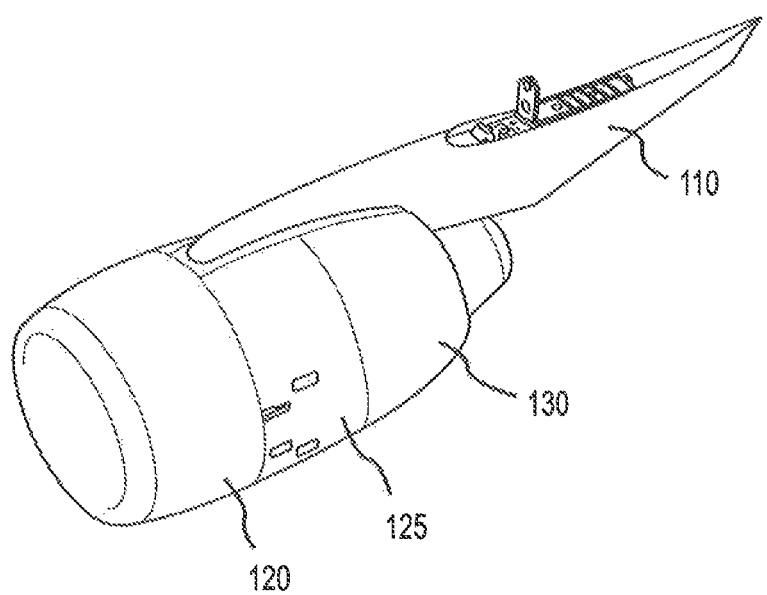
FIGS. 1A-1B depict a typical propulsion system and its elements.
Figure 1B:
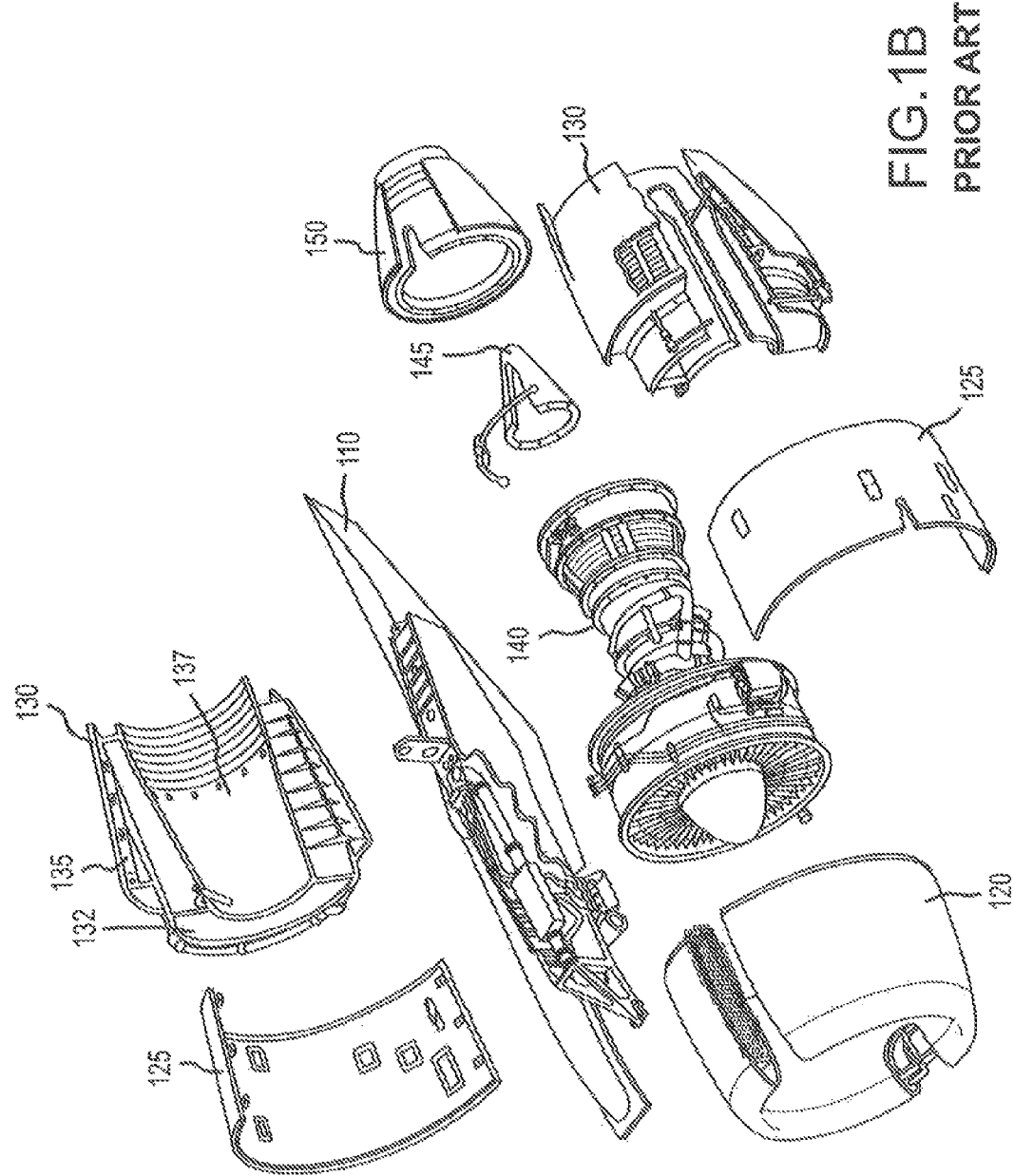

As depicted in FIGS. 1A and 1B, a typical propulsion system for a commercial jetliner includes an engine 140, pylon 110, and nacelle package. The typical nacelle package, or more simply the nacelle, may comprise an inlet 120, fan cowl 125, thrust reverser 130, and exhaust system including an exhaust cone 145, and exhaust nozzle 150. The nacelle surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The flow of air into the engine core flowpath passes first through a compressor that increases the pressure, and then through a combustor where the compressed air is mixed with fuel and ignited. The combustion of the fuel and air mixture causes a series of turbine blades at the rear of the engine core to rotate and in turn to drive the engine's compressor and fan. The high-pressure exhaust gases from the combustion of the fuel and air mixture are thereafter directed through an exhaust nozzle at the rear of the engine at high speed for thrust.

Air in the bypass flowpath is compressed by the fan and then directed around the engine core in a duct or ducts defined by the nacelle. The bypass air exits the duct through a nozzle at the rear of the propulsion system to provide thrust. In turbofan propulsion systems, the bypass flow typically provides a large portion of the thrust. If the nacelle includes a typical thrust reverser, the thrust reverser selectively blocks bypass air in the bypass air duct from reaching the nozzle, and instead redirects the bypass air to exit the duct in a forward direction of the aircraft to generate reverse thrust.

Figure 2A:
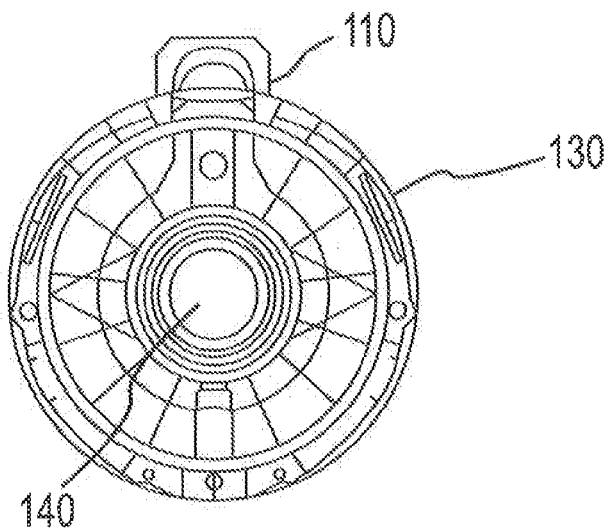
FIGS. 2A-2B is a schematic depiction of a typical hinged opening of the thrust reverser.
Figure 2B:
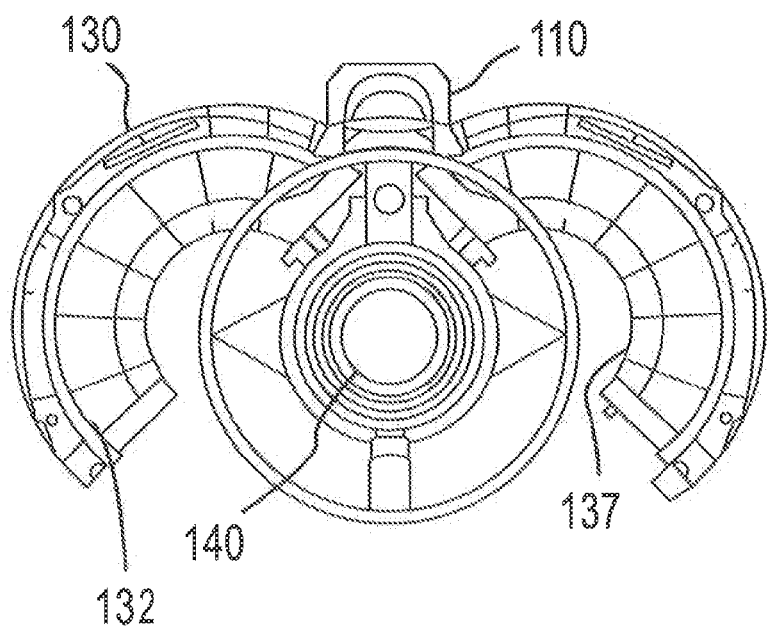

The thrust reverser 130 is typically hinged to the pylon 110 with one or more hinges. This typical hinged attachment and relative hinging motion is depicted in FIGS. 2A-2B. The thrust reverser 130 typically comprises an inner fixed structure (IFS) 137 and an outer sleeve 132 which cooperate to define between the bypass duct. Traditionally, the outer sleeve 132 and the IFS 137 rotate in unison (as one element).

An exterior surface of the outer sleeve 132 is part of the aerodynamic outer surface of the nacelle. An interior surface of the outer sleeve 132, along with the outer surface of the IFS, partially defines the bypass duct. A typical thrust reverser may be constructed in two halves, with a right hand outer sleeve 132 and a right hand IFS making up one half, and a left hand outer sleeve 132 and a left hand IFS making up the other half. The left half and the right half of the thrust reverser latch together when the thrust reverser is closed. In a typical arrangement, the IFS right half is fixed or attached to the outer sleeve 132 right half with fasteners, and likewise the IFS left half is fixed or attached to the outer sleeve 132 left half with fasteners, and each assembly is independently hinged to a support structure such as the pylon. When each thrust reverser half is closed, the IFS right half and left half cooperate to form a chamber around the engine core. According to various embodiments and with reference to FIG. 3, the inner fixed structure halves 432, 437 (IFS) and outer sleeve halves 460, 465 may be separately hinged or attached to a supporting structure such that the movement of the inner fixed structure halves 432, 437 (IFS) may be independent of the movement of outer sleeve halves 460, 465. For instance, the inner fixed structure half 432 and outer sleeve half 465 may be hinged separately to different parts and/or locations of the pylon with either coaxial or noncoaxial hinging axes. Or, the IFS half 432 may be hinged to the outer sleeve half 465, with the outer sleeve half 435 in turn hinged to the pylon or other supporting structure. Moreover, at least one of the outer sleeve halves 460, 465 and the inner fixed structure halves 432, 437 may be configured to slide in a fore and aft direction while at least one of the outer sleeve halves 460, 465 and the inner fixed structure halves 432, 437 may be configured to rotate about an axis.

Figure 3:
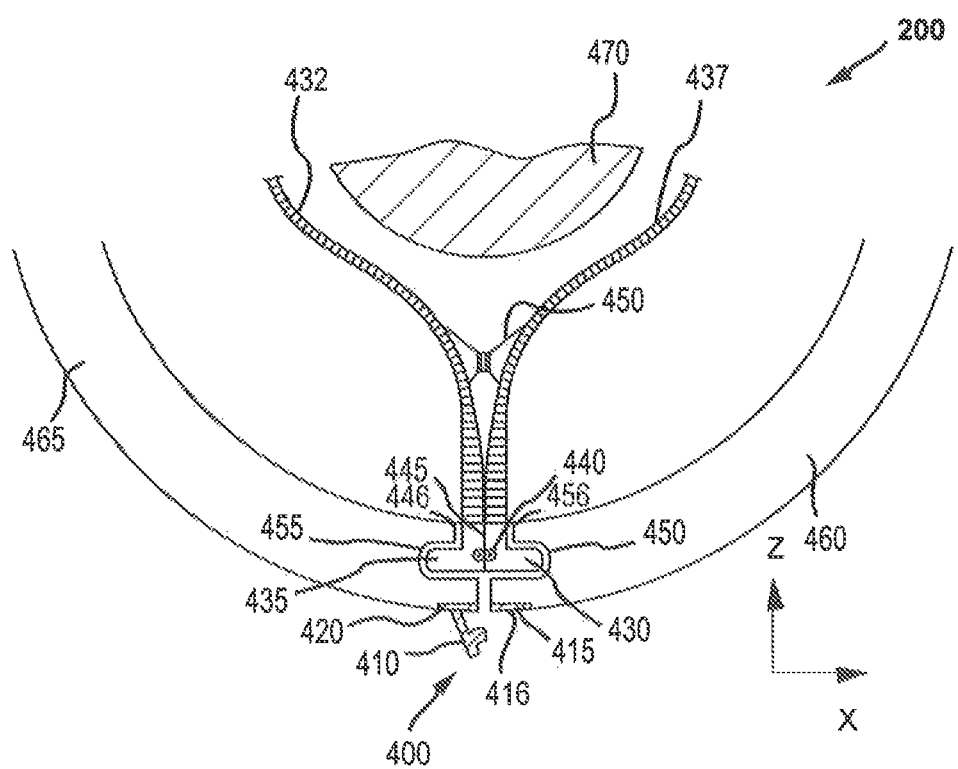
FIG. 3 depicts a cross-sectional schematic view of an inner fixed structure securing system in accordance with various embodiments.

According to various embodiments and with renewed reference to FIG. 3, latch system 200 where one latch may be used to retain both IFS halves 432, 437 and retain outer sleeve halves 460, 465 is disclosed. Latch system 200 may comprise more than one latch, such as three latches per nacelle, (e.g. at distinctly different locations axially along the lower edge of the sleeve), that each retain separately hinged IFS halves 432, 437 and outer sleeve halves 460, 465. For instance, the lower edge of IFS halves 432, 437 may comprise one or more structures configured to mate with and/or be captured by receptacles, such as beam like receptacles, of the outer sleeve 460, 465. A single latch of latching system 200 can then be used to latch all 4 panels, (e.g. both halves of the IFS 432, 437 and both halves of the outer sleeve 460,465) together and/or in a closed and retained position. Seals may be positioned between the interfaces of components.

Tracks 450, 455 may span all or a portion of the axial length of outer sleeve halves 460, 465. Similarly, flanges 435, 430 may span all of a portion of the axial length of IFS halves 432, 437. Tracks 450, 455 may be any suitable shape. Tracks 450, 455 may be integral to outer sleeve halves 460, 465, or they may be coupled to outer sleeve halves 460, 465.

Flanges 435, 430 may be any suitable shape. Flanges 435, 430 may be integral to IFS halves 432, 437, or they may be coupled to the IFS halves 432, 437. Though the flanges 435, 430 are depicted extending into a recess, (e.g. track 450, 455) formed in outer sleeve doors 460, 465, it is contemplated herein that outer sleeve halves 460, 465 may have an element extending into a recess formed in a distal end of IFS halves 432, 437.

In operation, the two halves of IFS 432, 437 may be oriented in a closed position such that the two halves of IFS 432, 437 are substantially adjacent and the two outer sleeve halves 460, 465 may be closed around the two halves of IFS 432, 437 and in particular around flanges 435, 430. Two outer sleeve doors 460, 465, at least partially encapsulating flange 435, 430 may be retained in the closed position by latch system 200. Latch system 200 may be any latch system configured to lock two surfaces together. Two surfaces together may refer to "in close proximity" as shown by location 445 in FIG. 3.

Seals may be located as desired within system 200. For instance, seals 446, 456 may be located at or near the union of track 455 and flange 435 and/or the union of track 450 and flange 430. Seals 446, 456 may be configured as an aerodynamic and/or performance seal. System 200 is designed such that rattling, chafing and premature wear of latching system 200 elements do not occur. Seals 446, 456 may reduce this wear and/or exist for deflection purposes. Stated another way, seal 446, 456 may reduce metal on metal contact, rubbing and/or vibrating.

A fire seal 440 may be located at any location within system 200. For instance, a fire zone may be maintained via a fire seal 440 being located toward the distal end and mating of IFS 432, 437 halves. Thus, the IFS of system 200 is a fire barrier to the rest of the nacelle. Stated another way, the fire zone, which may be viewed as the engine core and the area surrounding the engine core, are sealed via fire seal 440.

The latching system may include a latch 410 held within a latch housing 420 that is secured to the outer sleeve door 465. On the adjacent outer sleeve door 460, a keeper 415 is secured within a keeper housing 416 for engaging the latch 410 to close the latching system 200. Each housing 420, 416 may be permanently and/or integrally fixed to the respective outer sleeve door 465, 460.

Latch system 200 which serves as described above to hold closed both the IFS halves and the outer sleeve halves is lighter weight than would be a set of latches which hold closed only the IFS halves and a separate set of latches which hold closed only the outer sleeve halves. The IFS halves may be captured by the closed outer sleeve halves. Stated another way, in response to being captured, the IFS halves cannot open as the closed outer sleeve halves interfere with the IFS halves kinematic operation. The term "kinematic" may include radial, rotational, and axial movement. Also, The IFS halves may be captured in such a way as they can remain restrained during a burst pneumatic duct event, thereby preventing an engine failure from propagating to the rest of the aircraft.

Figure 4:
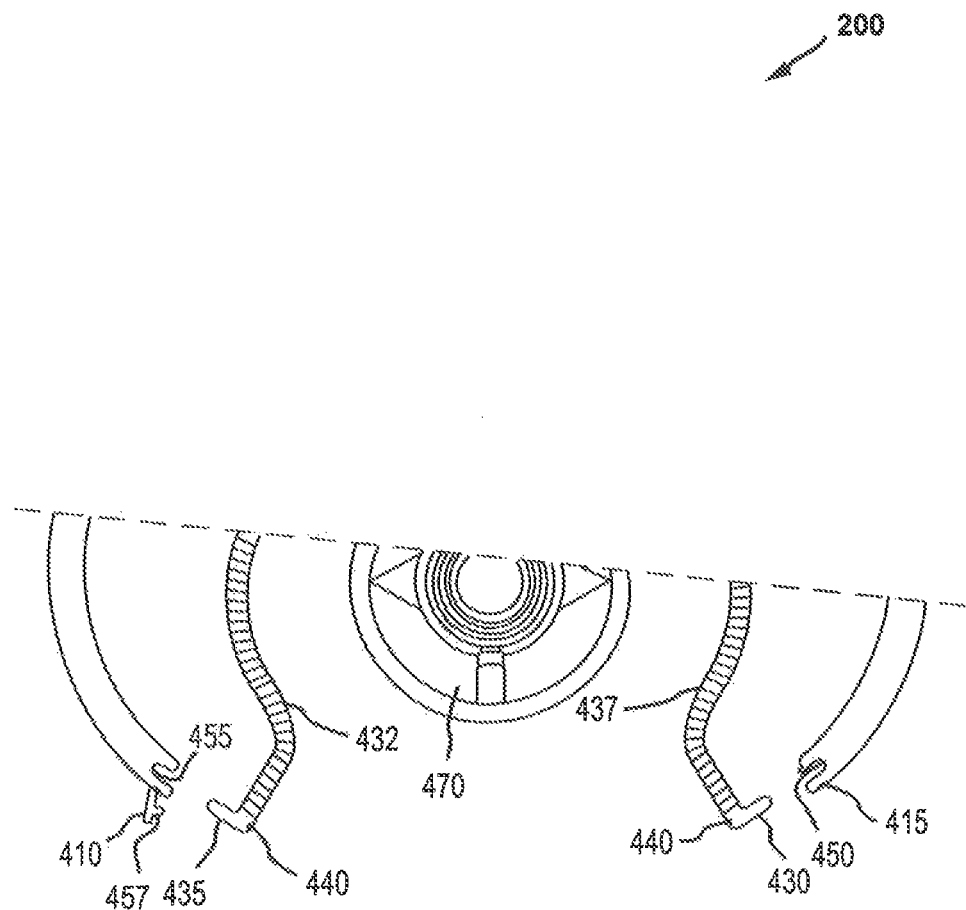
FIG. 4 depicts a cross-sectional schematic view of the thrust reverser of FIG. 3 in an open position.

FIGS. 3 and 4 show cross-sectional views of exemplary outer sleeve doors 465, 460 in closed and open positions, respectively. In the closed position, the latch 410 and keeper 415 would be securely engaged, whereas in the open position, the latch 410 and keeper 415 are disengaged (as depicted in FIG. 4).

In response to latch system 200 being in a closed position, a handle coupled to latch 410 rests within a depression (not shown) formed in the outer sleeve doors 465 so that an aerodynamic profile is formed. The latch 410 and keeper 415 can be any latch and keeper suitable for the purpose and will function in a manner known to those of ordinary skill in this art. When properly loaded and locked in a closed position, the latching system 200 is configured to retain the outer sleeve doors 460, 465 in a closed orientation. The handle may be marked with a visual indicator such as, painted red, for extra visibility so that when moved away from the keeper 415, the handle hangs down below the engine 470 nacelle to provide visual indication that the latching system 200 is in an open position.

Sensors, such as a strain gauge 457 depicted in FIG. 4, may be coupled to the system to indicate at least one of that the outer sleeve doors 465, 460 are touching and/or in a locked position, that the latching system 200 is closed, that latching system 200 is open, and/or that two halves of IFS 432, 437 are touching, such as at bumper 450. The sensors may be configured to sense conductivity, power level, strain, temperature, pressure, torsion, compression, tension, as well as any other sensing of the conditions or characteristics of a latch system 200 and or structures 432, 437, 465, 460. These sensors may at least one of wired or wirelessly transmit an indication to at least one of a pilot, cockpit, maintenance personnel at a receiver and/or display.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

I claim:

1. A latch system configured for a thrust reverser assembly of an engine nacelle comprising:
    a first outer sleeve door and a second outer sleeve door each mounted for movement between an outer sleeve door open position and an outer sleeve door closed position, the first outer sleeve door comprising a first recess at a lower edge of the first outer sleeve door, the first recess comprising a first upper wall, a first lower wall, and a first side wall, and the second outer sleeve door comprising a second recess at a lower edge of the second outer sleeve door, the second recess comprising a second upper wall, a second lower wall, and a second side wall; and
    a first inner fixed structure half and a second inner fixed structure half each mounted for movement between an open position and a closed position, the first inner fixed structure half comprising a first flange at a lower edge of the first inner fixed structure half and the second inner fixed structure half comprising a second flange at a lower edge of the second inner fixed structure half, wherein the first inner fixed structure half and the second inner fixed structure half are configured for independent kinematic movement from the independent kinematic movement of the first outer sleeve door and the second outer sleeve door, and wherein in response to the first outer sleeve door and the second outer sleeve door being in a closed position, the first inner fixed structure half and the second inner fixed structure half are retained by contact between the flanges and the recesses such that kinematic movement between the open position and the closed position of the first inner fixed structure half and the second inner fixed structure half is prevented.

2. The latch system of claim 1, further comprising a pylon, wherein the first inner fixed structure half and the second inner fixed structure half are hingeably coupled to the pylon along a first axis of rotation, and wherein the first outer sleeve door and second outer sleeve door are hingeably coupled to the pylon along a second axis of rotation.

3. The latch system of claim 2, wherein the first axis of rotation and the second axis of rotation are different axes.

4. The latch system of claim 2, wherein the first outer sleeve door and first inner fixed structure half are coupled to the pylon independently.

5. The latch system of claim 1, wherein the first outer sleeve door and the second outer sleeve door are both separate structures from the first inner fixed structure half and the second inner fixed structure half.

6. The latch system of claim 1, wherein the first outer sleeve door, the second outer sleeve door, the first inner fixed structure half, the second inner fixed structure half are all at least partially retained by a single latch of the latch system.

7. The latch system of claim 1, wherein the first recess is configured to at least partially enclose a portion of a distal edge of the first inner fixed structure half.

8. The latch system of claim 7, wherein the first recess is integral to the first outer sleeve door.

9. The latch system of claim 7, wherein a seal is coupled between a union of the first inner fixed structure half and the first outer sleeve door.

10. The latch system of claim 1, wherein a fire seal is coupled between a union of the first inner fixed structure half and the second inner fixed structure half.

11. The latch system of claim 1, wherein a sensor is configured to indicate that the first outer sleeve door and the second outer sleeve door are retained in a closed position.

12. The latch system of claim 1, wherein a surface of the first inner fixed structure half and a surface of the first outer sleeve door are configured to cooperate to define between them a portion of a bypass duct.

13. A system for a thrust reverser assembly of an engine nacelle comprising:
    a first outer sleeve door mounted for movement between a first open position and a first closed position, the first outer sleeve door comprising a recess at a lower edge of the first outer sleeve door, the recess comprising an upper wall, a lower wall, and a side wall;

a second outer sleeve door;

a first inner fixed structure half mounted for movement between a second open position and a second closed position, the first inner fixed structure half comprising a flange at a lower edge of the first inner fixed structure half; and a second inner fixed structure half, wherein the first inner fixed structure half is configured for independent kinematic movement from kinematic movement of the first outer sleeve door; wherein the second inner fixed structure half is configured for independent kinematic movement from kinematic movement of the second outer sleeve door, and wherein in response to the first outer sleeve door and the second outer sleeve door being latched together, kinematic movement of the first inner fixed structure half and the second inner fixed structure half is prevented by contact between the recess and the flange.

14. The system of claim 13, wherein the first inner fixed structure half and the first outer sleeve door are configured to cooperate to define between them a first portion of a bypass duct; and wherein the second inner fixed structure half and the second outer sleeve door are configured to cooperate to define between them a second portion of the bypass duct.

15. The system of claim 13, wherein the first outer sleeve door and first inner fixed structure half, the second outer sleeve door and the second inner fixed structure half are coupled to a pylon each configured for independent kinematic movement.

* * * * *